(12) United States Patent
Smith

(10) Patent No.: US 8,005,133 B2
(45) Date of Patent: *Aug. 23, 2011

(54) DISPLAYING EYE-DIAGRAM AND DIGITAL DIAGNOSTIC DATA USING NETWORK ANALYZERS

(75) Inventor: Dale Trenton Smith, San Jose, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 1104 days.

This patent is subject to a terminal disclaimer.

(21) Appl. No.: 11/741,587

(22) Filed: Apr. 27, 2007

(65) Prior Publication Data

US 2008/0187033 A1 Aug. 7, 2008

Related U.S. Application Data

(60) Provisional application No. 60/795,809, filed on Apr. 27, 2006.

(51) Int. Cl.
*H04B 3/46* (2006.01)
(52) U.S. Cl. ....................................................... 375/228
(58) Field of Classification Search .................. 375/228, 375/346, 224; 398/19, 138
See application file for complete search history.

(56) References Cited

U.S. PATENT DOCUMENTS

| | | | |
|---|---|---|---|
| 6,181,267 B1 | 1/2001 | MacDonald et al. | |
| 7,630,631 B2 * | 12/2009 | Aronson et al. | 398/22 |
| 2003/0165259 A1 * | 9/2003 | Balent et al. | 382/113 |
| 2004/0131113 A1 * | 7/2004 | Rao | 375/226 |

OTHER PUBLICATIONS

*Finisar's GTX Product Line Offers Complete & Accurate Analysis*, Copyright 2002 Finisar Corporation (4 pages).
*Protocol Knowledgeable GT-B Bit Error Rate Test System and Gigabit-Rate Physical Layer Verification System*, Finisar Corporation Dec. 2000 (4 pages).
*GTX-SANMetrics Fibre Channel & GigE/iSCSI Debug & Analysis Tool*, Finisar (4 pages).
*Transmeta Efficeon TM8600 Processor*, Transmeta Corporation, Jun. 2003, (2 pages).
*NP-1c Network Processor 10-Gigabit 7-Layer Network Processor with Integrated Search Engines*, http://www.ezchip.com/html/pr_np-1c.html, printed Dec. 2, 2004.
*Implementing Layer 4-7 Switches Using the NP-1c Network Processor*, EZchip Technologies Ltd., Feb. 17, 2007 (6 pages).
*What is Programmable Logic?* Copyright 1994-2004 Xilinx, Inc. http://www.xilinx.com/company/about/programmable.html, printed Dec. 17, 2004 (3 pages).
*Agilent Technologies E2688A, N5384A High-Speed Serial Data Analysis and Clock Recovery Software for Infiniium Oscilloscopes*, Agilent Technologies, Inc. Apr. 30, 2006 (8 pages).

* cited by examiner

*Primary Examiner* — Khai Tran
(74) *Attorney, Agent, or Firm* — Matthew A. Pequignot; Pequignot + Myers LLC

(57) ABSTRACT

Methods and apparatuses for displaying information for analyzing a signal transmitted in a communication system. The method can include displaying digital diagnostic data received from a monitoring interface of a transceiver. An eye-diagram for the signal is also displayed. The digital diagnostic data, network protocol analysis results, and/or the eye-diagram can be selectively displayed using a combined unit or stand alone units. Additionally, results of network protocol analysis can also be displayed with the digital diagnostic data and eye diagram.

20 Claims, 12 Drawing Sheets

| Bit Number | Cycle Position of Sample (%) | Amplitude of Sample |
|---|---|---|
| 0 | 0 | 0 |
| 22 | 4.35 | 0.136 |
| 44 | 8.71 | 0.270 |
| 66 | 13.07 | 0.399 |
| 88 | 17.42 | 0.521 |
| 110 | 21.78 | 0.632 |
| 132 | 26.14 | 0.732 |
| 154 | 30.50 | 0.818 |
| 176 | 34.85 | 0.889 |
| 198 | 39.21 | 0.943 |
| 220 | 43.57 | 0.980 |
| 242 | 47.93 | 0.998 |
| 264 | 52.28 | 0.997 |
| 286 | 56.64 | 0.978 |
| 308 | 61.00 | 0.941 |
| 330 | 65.35 | 0.886 |
| 352 | 69.71 | 0.814 |
| 374 | 74.06 | 0.728 |
| 396 | 78.42 | 0.627 |
| 418 | 82.78 | 0.515 |
| 440 | 87.13 | 0.393 |
| 462 | 91.49 | 0.264 |
| 484 | 95.85 | 0.130 |

*Fig. 3*

DISPLAYING EYE-DIAGRAM AND DIGITAL DIAGNOSTIC DATA USING NETWORK ANALYZERS

CROSS-REFERENCE TO RELATED APPLICATIONS

This application claims the benefit of U.S. Provisional Application Ser. No. 60/795,809 filed on Apr. 27, 2006, which is incorporated herein by reference in its entirety.

BACKGROUND OF THE INVENTION

1. The Field of the Invention

The present invention relates generally to analysis of data transferred in a data transmission link.

2. The Relevant Technology

As the world becomes increasingly dependent on electronic data, there is an increased need for speed, bandwidth, and integrity in communication systems. Typically, various protocols are used to transfer data between the various components of a communication system. Examples of commonly used protocols are Fibre Channel, Gigabit Ethernet, Sonet, Infiniband, Rapid IO, PCI Xpress and others. Generally, the protocols are associated with a specific type of data communication. For example, the Fibre Channel protocol may be used to transfer data between storage area networks such as redundant array of inexpensive disk (RAID) systems, just a bunch of disks (JBOD) systems, workstations, and servers.

In these and other communication systems, testing for types of use, errors, and signal integrity can be advantageous. Often, problem identification, analysis, and resolution in communications systems involve capturing a portion of the network data traffic for review and analysis.

Various hardware and software tools have been developed to assist in analyzing data signals. In some cases, data capture is performed in connection with an optical transceiver that has a monitoring interface that is capable of performing diagnostic analysis of the network data. Such analysis is useful in monitoring parameters such as output power, input power, temperature, laser bias current, transceiver supply voltage, and the like.

Another tool that can be used to analyze integrity of signals transmitted over a data transmission link is an oscilloscope. One way that an oscilloscope can be used is to present an eye-diagram of an optical signal to a user. An eye-diagram can be used to analyze a signal for many purposes and can provide a visual representation of whether an interconnect meets an eye-diagram test specification for a given standard. Well known purposes for presenting an eye-diagram are to provide a measurement of total jitter (deterministic and random jitter combined) and extinction ratio (ratio of average high to average low logic level). Jitter can indicate how frequency is changing from bit to bit. Jitter can be represented in an eye-diagram by the vertical slope of the eye-diagram. Modern sampling oscilloscopes can display the jitter histogram at the threshold crossing and can use "eye masks" to spot violations of jitter and amplitude noise for both Fibre Channel and Gigabit Ethernet. An eye-diagram typically displays multiple waveform crossings simultaneously on an overlaid time base. Characterization of an eye-diagram can include mask testing as well as other eye-diagram measurements. While each of these tools provide useful information describing a data signal, traditional implementations of both oscillators and transceivers require a large amount of expensive equipment. Moreover, as data rates and bandwidth capabilities continue to increase, such equipment will become even more expensive.

Thus, there is a need for a cost effective method and apparatus capable of generating both an eye diagram and digital diagnostics in a high speed data transmission link.

BRIEF SUMMARY OF THE INVENTION

A method for displaying information describing a signal transmitted in a communication system is described. The method can include displaying digital diagnostic data transmitted by a monitoring interface of a transceiver and displaying an eye-diagram for the signal.

An apparatus for displaying digital diagnostic data along with an eye-diagram is described. The apparatus can include a transceiver configured to receive the signal. The transceiver can include a monitoring interface providing digital diagnostic data including real time access to information describing signal parameters. The apparatus can further include a processor. The processor can include computer executable instructions that cause the processor to generate an eye-diagram. The apparatus can further include a display configured to receive and display the digital diagnostic data along with the eye-diagram.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIG. 3 is a chart illustrating example data structures that may be stored in memory corresponding to a sampling of a signal transmitted in a transmission link;

DETAILED DESCRIPTION OF THE PREFERRED EMBODIMENTS

Figure 1A:
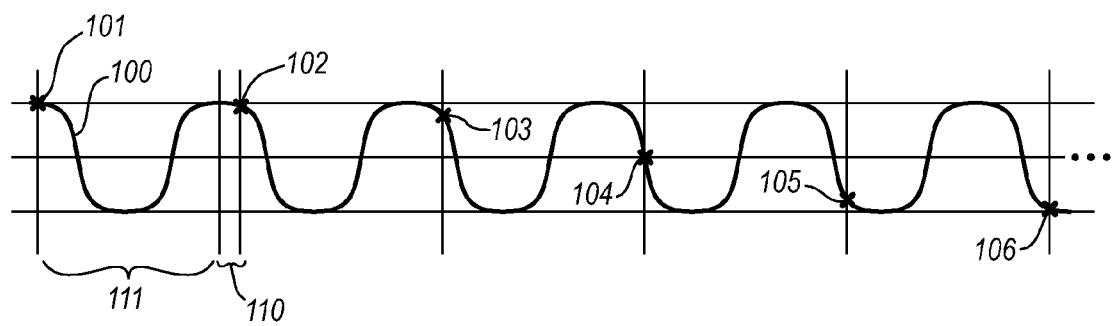
FIG. 1A illustrates an example of a digital signal transmitted over a communications link along with points indicating locations where the signal can be sampled and recorded in order to generate an eye-diagram.

Embodiments of the present invention relate to analysis of data transferred in a data transmission link. The principles of the present invention are described with reference to the attached drawings to illustrate the structure and operation of example embodiments used to implement the present invention. Using the diagrams and description in this manner to present the invention should not be construed as limiting its scope. Additional features and advantages of the invention will in part be obvious from the description, including the claims, or may be learned by the practice of the invention. Detailed descriptions of well-known components and processing techniques are omitted so as not to unnecessarily obscure the invention in detail.

An aspect of high speed signal transmission that some embodiments of the present invention are concerned with is utilizing the known bit-rate of a signal to construct an eye-diagram. Because the bit-rate of a signal is in many circumstances known and relatively constant, an eye-diagram can be constructed from an under-sampling of a signal taken at a known harmonic frequency of the signal bit-rate. These samples can be used to construct an eye-diagram that can be used for analysis of the data signal.

Another aspect of some embodiments of the present invention is identifying a trigger point from samples of a signal, and using the trigger point as a reference to sample the signal and/or construct the eye-diagram. The trigger point can also be used with software to construct an eye-diagram from samples stored in memory. Some embodiments also include aspects of sampling a signal so as to ensure that at least one sample is received identifying the trigger point. One result of several aspects of the present invention is that eye-diagrams can be displayed, for example, using a network protocol analyzer or a stand-alone unit without the need for the often cost-prohibitive equipment required in the past.

Another aspect of some embodiments of the present invention includes utilizing a digital diagnostic output from an optical transceiver to display additional information about the communication link, the signal, or the transceiver. This information may be displayed along with the eye-diagram. This can be accomplished, for example, using a single combined unit, or using a stand alone unit.

The different aspects of the present invention can by carried out by many different methods, which can be practiced using many different apparatuses. Different embodiments of the present invention can also combine the different aspects of the present invention in various combinations and configurations. Thus, what follows are several examples of methods and apparatuses for practicing example embodiments of the present invention.

A. Sampling a Data Signal for Generating an Eye-Diagram

According to example embodiments of the present invention, a percentage of a harmonic frequency of a bit-rate of a data transmission channel can be used to sample a signal and construct an eye-diagram. One way that this bit-rate can be used is by undersampling the signal transferred over a channel. In this manner, the steady harmonic frequency of the signal can be used to construct an eye-diagram using samples taken less frequently than prior art methods of using an oscilloscope and taking many samples per bit unit.

Figure 1B:
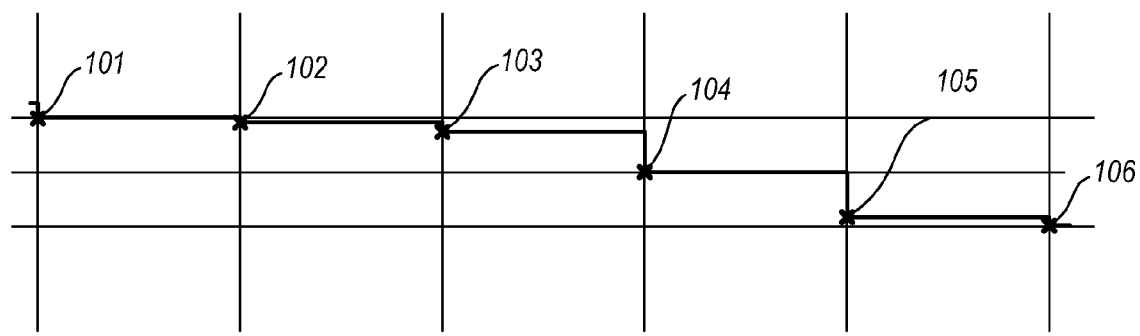
FIG. 1B illustrates an output of a sample and hold apparatus that can be used to hold the value of the sampled signal at that value for measurement and storage in memory.
Figure 1C:
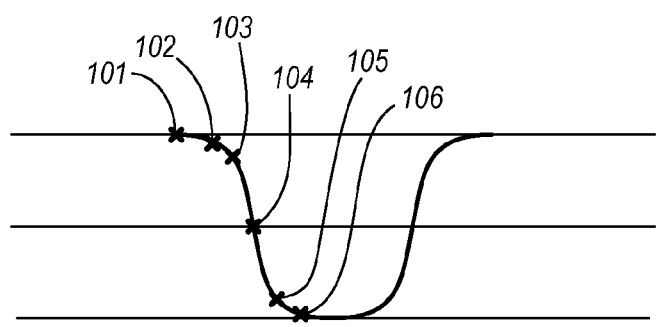
FIG. 1C illustrates a representation of a signal that can be reconstructed from the periodic samples taken of the signal.

Referring to FIGS. 1A, 1B, and 1C, graphs illustrating various stages of methods for constructing an eye-diagram by under-sampling of a signal received from a communication link are shown according to an example embodiment of the present invention. Referring to FIG. 1A, an illustration of an example is shown of a signal transmitted over a communications link along with points 101-106 indicating locations where the signal can be sampled and recorded in order to reconstruct the signal shown in FIG. 1C for creating an eye-diagram.

Referring still to FIG. 1A, a first sample 101 is taken at a first point in time along a signal 100 transmitted in (or received from) a transmission link. A clock can control the frequency (110 added to 111) at which each sample 101-106 is taken, and each sample 101-106 can be taken at a percentage of a harmonic frequency 111 of the signal 100. For example, as shown in FIG. 1A the harmonic frequency (110 added to 111) of the samples 101-106 taken of the signal 100 is slightly slower 110 than the harmonic frequency 111 of the signal 100. As shown, a first sample 101 can be taken and recorded followed by a second sample 102 that is taken at a point in time slightly later 110 than the harmonic frequency 111 of the signal 100 (i.e., the harmonic frequency of the signal divided by the integer 1). Similarly, a third sample 103 of the signal 100 can be taken after the second sample 102 at a time that is slightly later in time than the harmonic frequency of the signal 100. The same process can be followed for a fourth signal sample 104, a fifth signal sample 105, a sixth signal sample 106, and so on until a sufficient number of samples (e.g., hundreds, thousands, or several hundreds of thousands of samples) have been taken to reconstruct a signal as illustrated, in part, in FIG. 1C. While the harmonic frequency of the sampling shown in FIG. 1A is slightly slower than the harmonic frequency of the signal, it should be appreciated that the harmonic frequency of the sampling can be slightly faster or slightly slower than the harmonic frequency of the signal and can be divided by any integer to reduce the frequency of the sampling even more. For example, the harmonic frequency of the sampling can be slightly greater or slightly less than the harmonic frequency of the signal divided by an integer greater than 1, for example an integer between 2 and 100. The value of the integer can be any integer and can be determined based in part on the maximum speed of the components of the system sampling the signal.

Referring to FIG. 1B, a sample and hold apparatus (e.g., a sample and hold circuit) can be used to sample and hold the value of the signal for measurement and storage in memory. The value of a first sample 101 can be held until a second sample 102 is taken, at which point the sample and hold apparatus can hold the value at that second value 102 of the signal sampled until a third sample 103 is taken, and so on for samples 104-106, as illustrated in FIG. 1B. In this manner the speed of the apparatus converting the sampled analog value to a digital value and writing the sample values to memory does not need to be as fast as that described above for conventional eye-diagram generation systems.

Referring to FIG. 1C, a representation of a portion of a signal reconstructed from the periodic samples taken of FIGS. 1A and 1B is illustrated according to an example embodiment of the present invention. For example, referring to FIG. 1C, a first sample 101 can be plotted in time followed by the later samples 102-106. The distance in time between each sample 101-106 in FIG. 1C can correspond to a unitary step amount or frequency at which the samples are taken. Because many samples (e.g., hundreds of thousands of samples) can be taken at small unitary steps from the bit rate harmonic frequency (e.g., about 0.2% of a harmonic frequency) to reconstruct the eye-diagram, over time the accumulation of the samples can give a reasonably good depiction of an eye-diagram for purpose of analyzing the signal transmitted in the transmission link in a more cost-effective manner.

Figure 2:
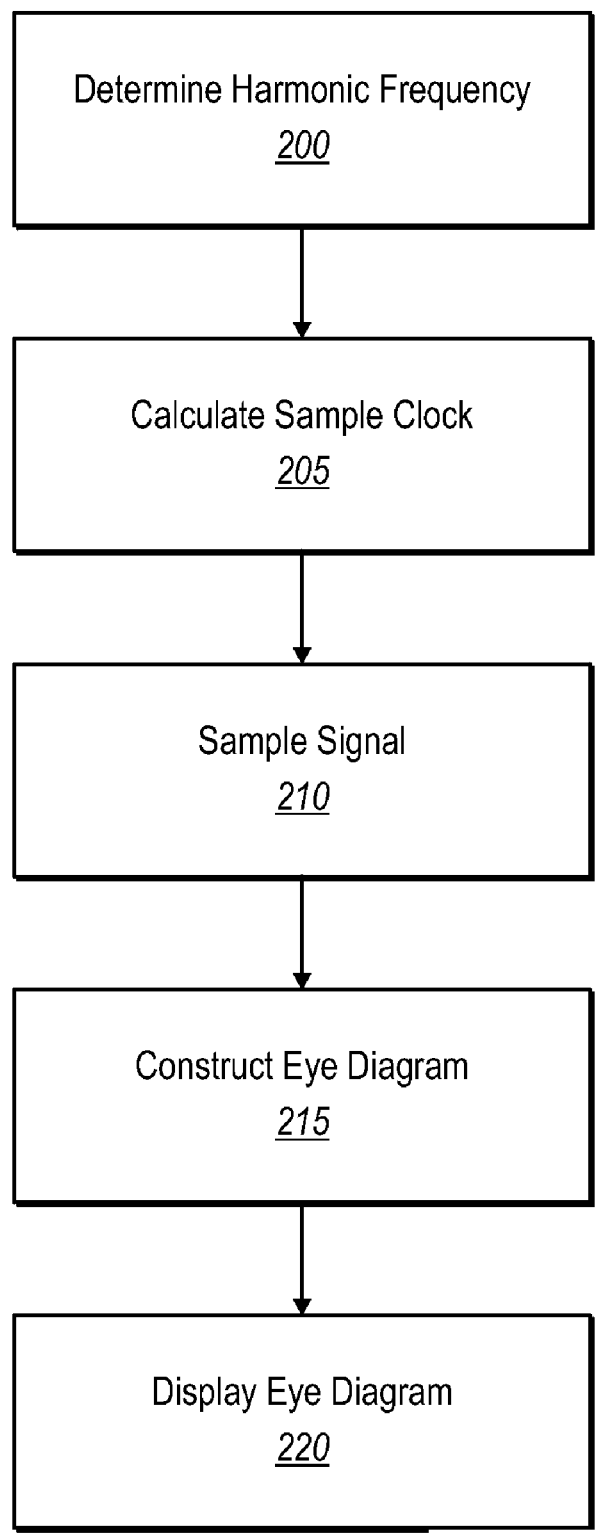
FIG. 2 illustrates a method for sampling a signal and constructing and displaying an eye-diagram according to an example embodiment of the present invention.

Referring now to FIG. 2, a block diagram is shown illustrating a method for constructing and displaying an eye-diagram according to an example embodiment of the present invention. A harmonic frequency can be determined (200). The harmonic frequency can be determined by dividing the bit-rate of a data signal by an integer to obtain a harmonic frequency that is within the maximum capabilities of every component (e.g., such as a maximum rate of an analog to digital converter or a maximum rate of a sample and hold apparatus or other device or circuit). For example, where the maximum sample rate of an analog to digital sampler is 200 MS/s, a 4.25 Gb/s bit-rate can be divided by the integer 22 to obtain a harmonic frequency of 193.18 MHz (i.e., 4250 MHz/ 22). A similar calculation can be made for any other bit rate, for example a bit rate between 1 Gb/s and 10 Gb/s. The integer can be any integer, for example an integer between 1 and 100.

A sample clock rate value can be calculated (205). The sample clock rate value can be based on the harmonic bit-rate calculated with the addition or subtraction of a desired unitary step precision for reconstructing the eye-diagram. The sample clock rate can be any percentage of a harmonic frequency of the bit-rate, for example between about 90 percent and 99.99 percent or between about 100.01 percent and 110 percent of a harmonic frequency of the bit-rate. According to an example embodiment, about 99.8% or 100.2% can be used, which gives a 0.2% unitary step precision to an eye-diagram generated from the samples. According to this preferred example, 99.8% of 1.93 MHz is 192.8 MHz, which gives a 0.2% resolution to the eye-diagram that is constructed from the samples. The signal can be sampled (210) at the calculated frequency. The signal can be sampled using a sample and hold apparatus, for example. The sample and hold apparatus can include a tap or other physical connection that samples the analog level of the signal, and a circuit that holds each analog level of the signal received until the next increment of the clock. The sampled value can be held steady while the value of the sample is determined. The value of the sample can be converted to a digital value and can be written to memory along with the value of other samples taken. Many samples can be taken and recorded to reconstruct a signal and/or display an eye-diagram. As discussed in more detail below, a golden PLL (i.e., a phase locked loop) can be used to filter the jitter to the scope trigger so that the displayed jitter is more correctly weighted. The PLL locks onto the data frequency either through hardware or software.

Next, the data stored in memory can be converted into a format for display as an eye-diagram to a user (215). For example, the data points can be organized in time so that they conform to a time value depiction of the signal for purposes of displaying the eye-diagram. The eye-diagram can be constructed to display multiple waveform crossings of the signal simultaneously on an overlaid time base (i.e., an eye-diagram) using any method. The data points can also be converted to a compatible format for display depending on the type of display or output of the eye-diagram implemented.

The data can then be displayed as an eye-diagram (220). The eye-diagram can be displayed using a LCD screen of a stand alone unit, a monitor of a computer system, the display of a network protocol analyzer, the screen of a hand held device, or a hard copy produced by a printer, for example. The data can also be output to a file or other storage medium for accessing the data points themselves. For example, algorithms can be used in conjunction with the eye-diagram data to calculate jitter, to determine extinction ratio, to identify samples violating an eye mask, or for any other reason.

Referring to FIG. 3, a chart is shown illustrating an example of data structures that may be stored in memory corresponding to a sampling of a sign wave signal transmitted in a transmission link. The samples indicated in FIG. 3 illustrate methods for sampling signals according to the present invention, but are not necessarily indicative of an actual signal that would be received and sampled to reproduce a signal and/or display an eye-diagram. As shown in FIG. 3, a bit number can be stored indicating the bit, or harmonic cycle, at which the sample is taken. In this example, an integer of 22 is used to calculate the harmonic cycle of a clock corresponding to the rate of the sampling. Thus, each sample taken is separated by 21 signal bit units in this example.

Next, a cycle position of the sample can be recorded. The cycle position of the sample can correspond to the precision of the undersampling of the signal and the relative position of each sample along a cycle of the signal. For example, in this example a unitary step of about 4.35% (e.g., relating to 110 in FIG. 1A) is used to sample the data. The amplitude of the signal sample can also be recorded and associated with the cycle position to reconstruct the signal.

Figure 4:
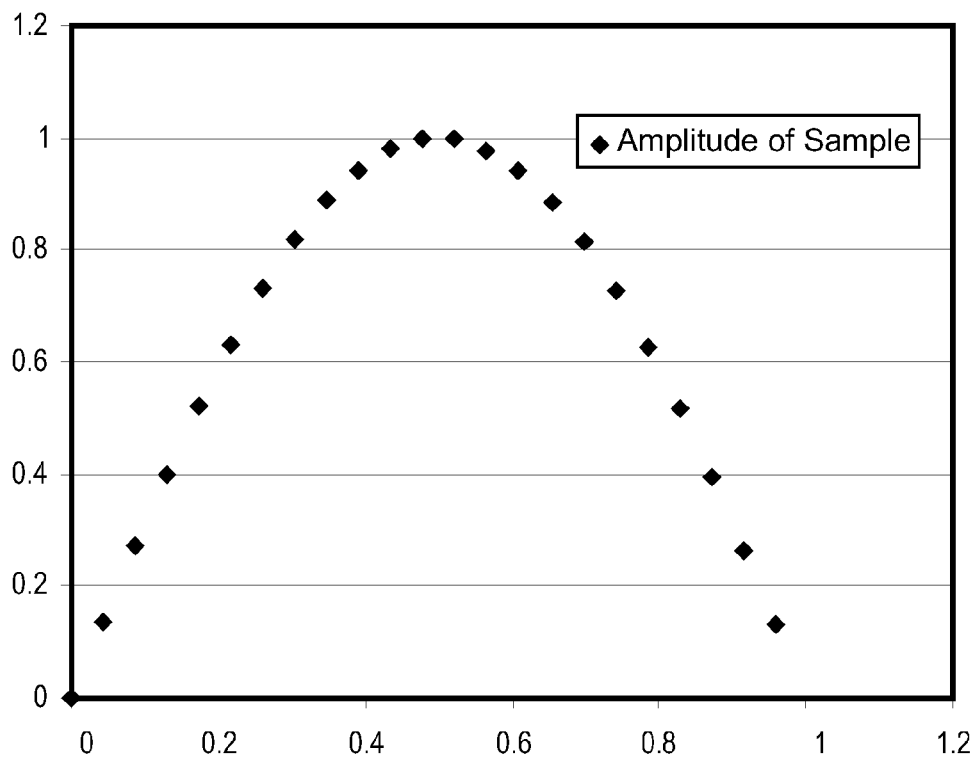
FIG. 4 illustrates a representation of the reconstructed signal produced by plotting the corresponding cycle position versus the amplitude points of the sampled data shown in FIG. 3.

FIG. 4 illustrates a representation of the reconstructed sign wave produced by plotting the corresponding cycle position versus the amplitude points of the sampled data shown in FIG. 3. The reconstructed sign wave shown in FIG. 4 is not created from several samples of a single sine wave oscillation, but rather is a portion of a sign wave signal created from 23 samples taken every 22 bit units of a sine wave signal over 484 harmonic oscillations of the signal. Thus, according to some example embodiments of the present invention, an analogous method of sampling and reconstructing a signal can be implemented to create an eye-diagram that provides useful information in a more cost-effective manner than that which may be created by conventional methods, such as using an oscilloscope.

B. Determining a Trigger Point for Eye-Diagram Generation

Figure 5:
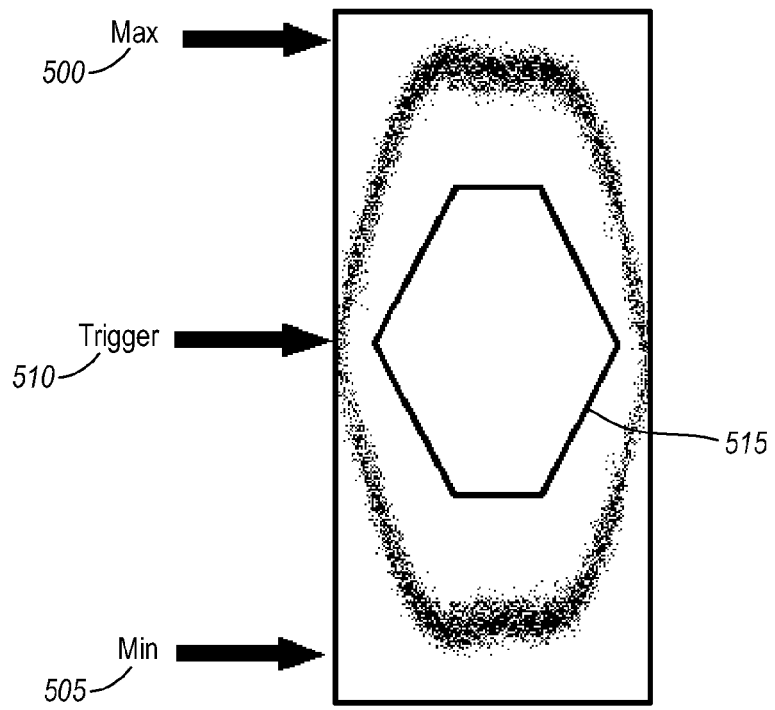
FIG. 5 illustrates an eye-diagram along with a superimposed eye mask.

An aspect of some embodiments of the present invention can include methods and apparatuses for determining a trigger point for generating and displaying an eye-diagram. Referring to FIG. 5, an eye-diagram is illustrated along with a superimposed eye mask 515 indicating locations within the eye-diagram where receipt of a signal can cause a misinterpretation of the optical signal. As shown, the eye-diagram can be defined by a maximum value 500, a minimum value 505, and a trigger point 510. The trigger point 510 may need to be identified as a reference point in order to overlay the signal oscillations to construct the eye-diagram. According to some embodiments of the present invention, the trigger point 510 can be defined as a point where the eye-diagram passes a midpoint between the maximum 500 and minimum 505 level of the eye-diagram.

In order to generate a useful eye diagram, it is important to place the data samples on the diagram with better than 1% accuracy. This is difficult because the eye mask 515 often takes up 67% of the sampled time period, leaving only 33% of the time period to generate the eye, and a sophisticated system will reduce the margin surrounding the eye to a small percentage of the total window. Thus, in order to generate useful data, it is necessary to compensate for multiple error sources. Some common errors include improperly identified trigger points due to non-symmetry of the waveform, deviations in the voltage of the signals, inaccurate or unknown signal frequencies, inaccurate or unknown sample frequencies, and an insufficient number of samples.

While each of these error sources may only introduce a slight amount of error to the system, their accumulated impact can be significant. Generally, the systems are sufficiently accurate for MHz frequencies and below, but there are added difficulties in Fibre Channel, SAS, SATA, or any other Gigabit bus systems. This is because the accuracy of the sample frequency is proportional to the number of bit times elapsed between the first and last sample. For example, if 23 samples are taken on 22-bit intervals, then it takes 484 bit times to generate an eye-diagram, and the diagram will only have 4.5% accuracy. Generally, such a system will only be useful for detecting large signal problems relating to the integrity of the system.

In order to detect smaller problems with the signal, the sampler will need to provide at least 100 samples to create the eye. Using the same method as above, if 100 samples are taken in 22-bit intervals, then it would take 2178 bit times for the first sample to last. Thus, for the eye sampler to have the desired 1% accuracy, the accuracy of the sample frequency relative to the signal frequency must be better than 1/(100*2178)=0.0000046. Since, most oscillators are accurate to only 0.000025, a PLL (i.e., a phase locked loop) or similar method may be used in order to filter the jitter to the scope trigger so that the displayed jitter is more correctly weighted.

As the frequency of a signal increases, there are many sources of error that can affect the ability of a system to generate an eye diagram, particularly at the GigaHertz frequencies. For example, the actual signal frequency may vary from the expected signal frequency. The actual sample frequency may differ from its nominal value. The accuracy may be further limited by the number of samples taken and the number of samples taken may be affected by the accuracy in identifying the signal frequency and in generating the desired sample frequency. Using a starting sample and an ending sample, and by using software to identify the actual ratio between the two frequencies (signal and sample), errors due to clock tolerances, temperature, and the like can be eliminated. These and other errors can also be eliminated in some embodiments using the methods disclosed in U.S. Pat. No. 6,181,267, which is incorporated by reference.

Figure 6A:
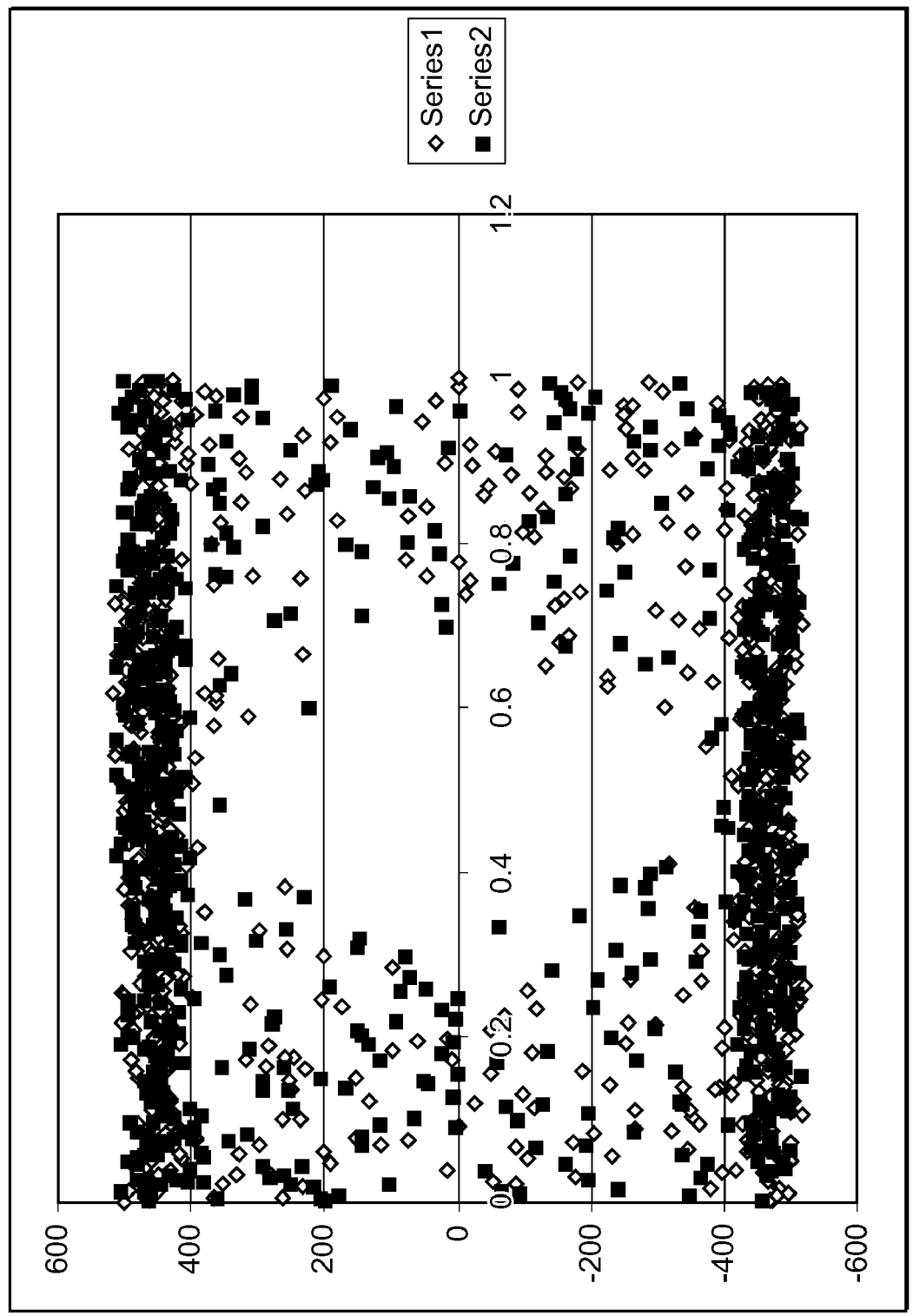
FIG. 6A illustrates the results of a sample eye-diagram created without the assistance of a PLL.
Figure 6B:
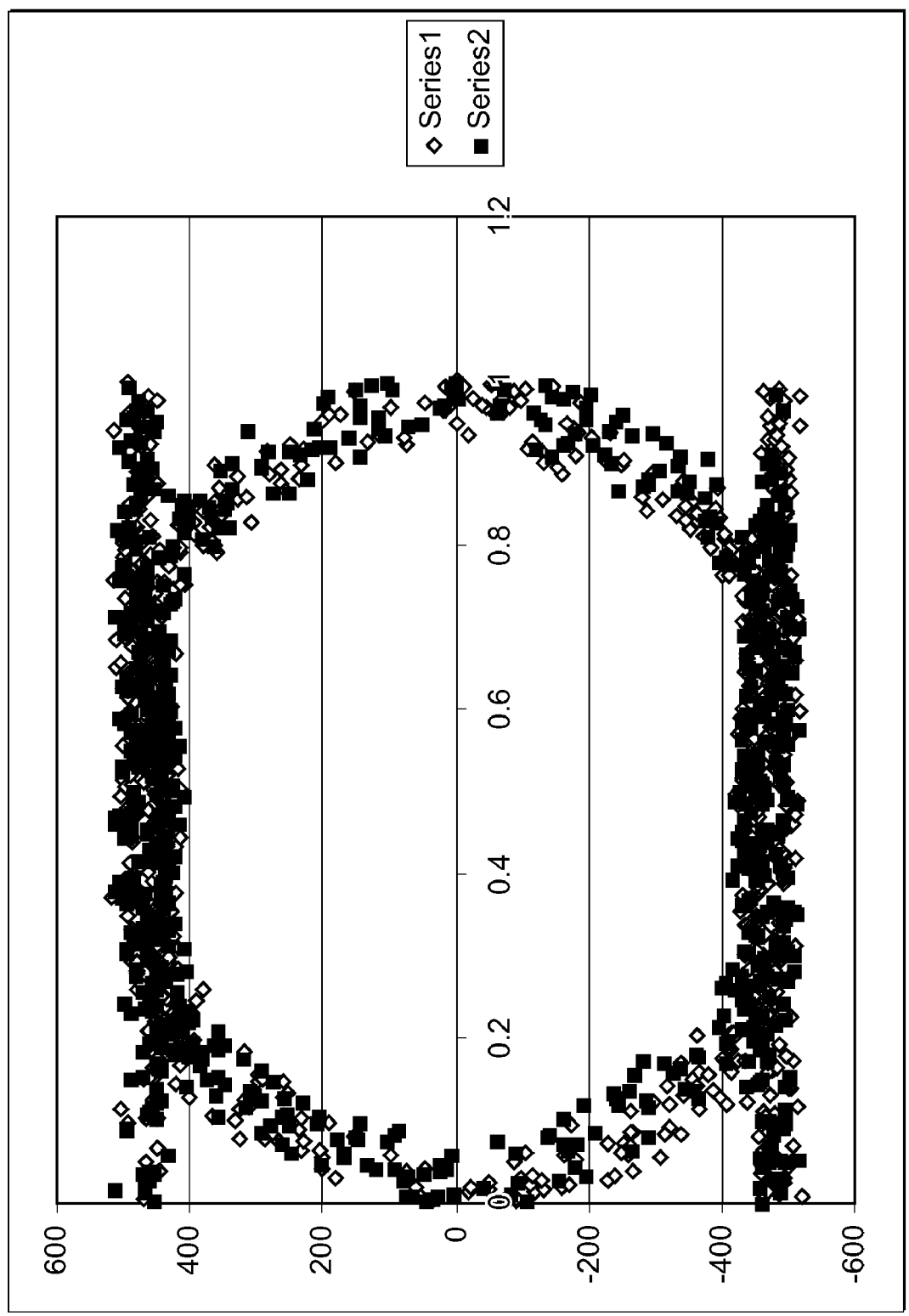
FIG. 6B illustrates the results of a sample eye-diagram created with the assistance of a PLL.

FIGS. 6A and 6B illustrate an eye diagram generated according to the methods disclosed in the present invention. FIG. 6A illustrates an eye diagram created using a configuration that does not include either software or hardware PLL. The PLL function is necessary to remove inaccuracies that may occur in sampled signals and the sample clock. Generally, the sample clocks may vary by 25-100 ppm and this variance creates increased inaccuracies in the eye diagram. FIG. 6B illustrates an eye diagram that is synchronized according to the frequency obtained through the PLL. As demonstrated in FIG. 6B, the PLL allows the repetitive sampling scope to lock onto the actual data frequency, resulting in a clearer, more acceptable eye diagram.

Figure 7:
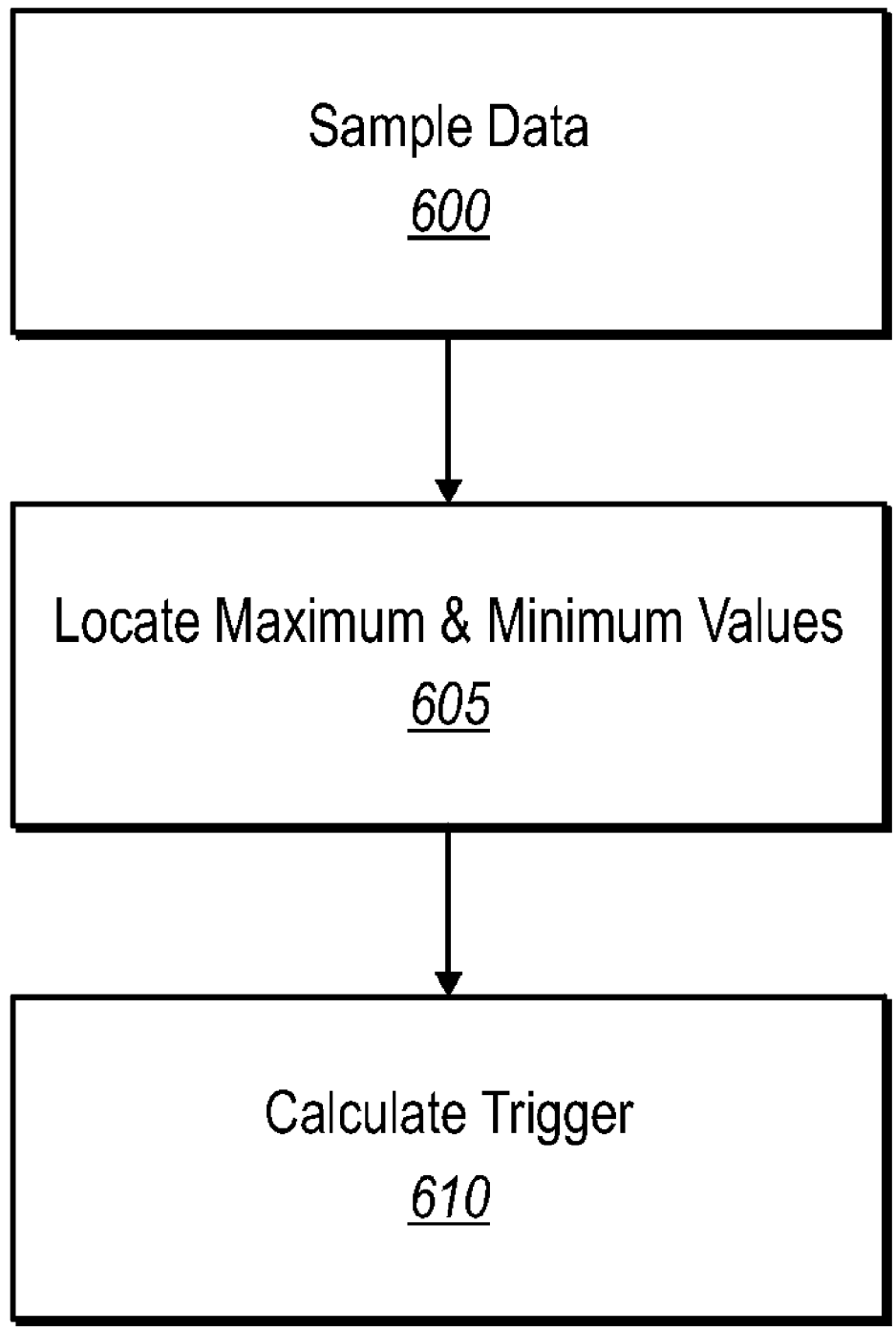
FIG. 7 illustrates a method for calculating a trigger according to an example embodiment of the present invention.

Referring to FIG. 7, a block diagram illustrating a method for identifying a trigger is shown according to an example embodiment of the present invention. A signal transmitted in a communication link can be sampled (700). The signal can be sampled using a tap and hold apparatus. The signal can be sampled several times per bit unit interval, or the data can be sampled using methods of undersampling to reconstruct the signal as discussed in further detail herein. The sampled data can be stored in memory, and many samples of the data signal can be recorded in order to ensure that enough samples are obtained to construct the eye-diagram.

Maximum and minimum values of the eye-diagram can be identified (705). Many samples of data can be queried to determine a maximum and minimum value sampled. The maximum and minimum values of a signal can also correspond to the maximum and minimum values of an eye-diagram that is generated as illustrated in FIG. 5. With continued reference to FIG. 7, once the maximum and minimum values are identified (705), a trigger point (i.e., a mid-point) can be calculated (710). The trigger point can be equal to the midpoint between the maximum eye-diagram value and the minimum eye-diagram value. The trigger can be calculated by dividing the difference of the minimum eye-diagram value and the maximum eye-diagram value by two and adding this value to the value of the minimum sample value.

For example, assume that a maximum sampled eye-diagram value is 2.2 volts and a minimum sampled eye-diagram value is 1.0 volts. Dividing the difference between the maximum and minimum values of the eye-diagram by two and adding this value to the minimum eye-diagram value yields a trigger point of 1.6 volts. This trigger point can then be used in conjunction with logic in a FPGA, or other trigger device, to trigger on an analog or digital output of 1.6 volts and sample a signal to overlay oscillations of the signal and create an eye-diagram. Where the bit-rate of the optical signal is known, the FPGA can begin sampling the signal and communicate with a display controller to overlay the signal oscillations in an eye-diagram display. In this manner, the trigger point calculated can be used as a reference point to sample the signal and generate the eye-diagram.

According to other embodiments of the present invention, the trigger point can also be used in conjunction with a set of signal samples stored in memory to construct an eye-diagram for the signal sampled. The samples can be taken at an under sampled harmonic rate of the signal bit-rate. In another embodiment, the many samples can be sampled at a known fraction of the frequency of the signal and then reconstructed about the trigger point to construct the eye-diagram. This method requires a large enough memory to store the many samples of data needed to construct the eye-diagram, and sufficient processing power to process the sampled data and generate the eye-diagram.

C. Displaying Digital Diagnostics Using Network Analyzers

According to another aspect of the present invention, data received from a monitoring interface of an optical transceiver can be displayed along with an eye-diagram and/or network data analysis results. Several different optical transceivers can include a monitoring interface, or bus, that provides additional information about the transmission link, the data signal, or the optical transceiver itself. According to several embodiments of the present invention, signals from a monitoring interface can be received and at least a portion of the information received from the monitoring interface can be displayed along with an eye-diagram and/or network protocol analysis results and information.

One example of additional information describing the types of data and apparatuses for producing and receiving such diagnostic data is contained within the published document "Digital Diagnostic Monitoring Interface for Optical Transceivers", SFF document number: SFF-8472, revision 9.0 (Mar. 28, 2002), the contents of which is hereby expressly incorporated herein by reference in its entirety. Three other documents applicable to this standard and other standards include "Gigabit Interface Converter (GBIC)", SFF document number: SFF-0053, rev. 5.5 (Sep. 27, 2000), and "Small Form Factor Pluggable (SFP) Transceiver MultiSource Agreement (MSA)", (Sep. 14, 2000), and "Digital Diagnostic Monitoring Interface for Optical Transceivers", SFF document number: SFF-8472, Draft 44 Revision 9.3 (Aug. 1, 2002), the contents of these documents are hereby expressly incorporated herein by reference in their entirety.

The monitoring interfaces of optical transceivers can allow real time access to device operating parameters. In some standards, this data can be referred to as I2C data and the types of data produced by this output are generally well known to one of ordinary skill in the art. The interfaces, however, may also add new options to the previously defined serial ID memory maps that accommodate new transceiver types that were not considered in the SFP MSA or GBIC documents described above. An interface can also be the serial ID interface defined in the GBIC specification, or an extension of the serial ID interface defined in the GBIC specification, for example.

A monitoring interface of an optical receiver, such as the serial ID interface or the I2C digital diagnostic interface, can be used to receive and display additional information for a user according to an aspect of several embodiments of the present invention. An interface can be backward compatible with other specifications, such as both the GBIC specification and the SFP MSA.

The enhanced digital diagnostic interface is a superset of the MOD DEF interface defined in the SFP MSA document dated Sep. 14, 2000. The 2 wire interface pin definitions, hardware, and timing are clearly defined therein. An enhanced interface uses the two wire serial bus address 1010001X (A2h) to provide diagnostic information about the module's present operating conditions.

Identifier values can specify the physical device described by the serial information. This value can be included in the serial data. Several examples of identifier values that can be accessed and displayed to a user are illustrated in Table 1 shown below.

TABLE 1

| Data Address | Size (Bytes) | Name of Field | Description of Field |
| --- | --- | --- | --- |
| 0 | 1 | Identifier | Type of Serial Transceiver |
| 1 | 1 | Ext. Identifier | Extended identifier of type of serial transceiver |
| 2 | 1 | Connector | Code for connector type |
| 3-10 | 8 | Transceiver | Code for electronic compatibility or optical compatibility |
| 11 | 1 | Encoding | Code for serial encoding algorithm |
| 12 | 1 | BR, Nominal | Nominal bit-rate, units of 100 MBits/sec. |
| 13 | 1 | Reserved | |
| 14 | 1 | Length (9 um)-km | Link Length supported for 9/125 Um fiber, units of km |
| 15 | 1 | Length (9 um) | Link Length supported for 9/125 Um fiber, units of 100 m |
| 16 | 1 | Length (50 um) | Link Length supported for 50/125 Um fiber, units of 10 m |
| 17 | 1 | Length (62.5 um) | Link Length supported for 62.59/125 Um fiber, units of 10 m |
| 18 | 1 | Length (Copper) | Link Length supported for copper, units of meters |
| 19 | 1 | Reserved | |
| 20-35 | 16 | Vendor Name | SFP Vendor name (ASCII) |
| 36 | 1 | Reserved | |
| 37-39 | 3 | Vendor OUI | SFP vendor IEEE company ID |
| 40-55 | 16 | Vendor PN | Part number provided by SFP vendor (ASCII) |
| 56-59 | 4 | Vendor Rev | Revision level for part number provided by vendor (ASCII) |
| 60-61 | 2 | Wavelength | Laser wavelength |
| 62 | 1 | Reserved | |
| 63 | 1 | CC-BASE | Check code for Base ID Fields (addresses 0 to 62) |
| 64-65 | 2 | Options | Indicates which optional transceiver signals are implemented |
| 66 | 1 | BR, max | Upper bit-rate margin, units of % |
| 67 | 1 | BR, min | Lower bit-rate margin, units of % |
| 68-83 | 16 | Vendor SN | Serial number provided by vendor (ASCII) |
| 84-91 | 8 | Date code | Vendor's manufacturing date code |
| 92 | 1 | Diagnostic Monitoring Type | Indicates which optional enhanced features are implemented in the transceiver |
| 93 | 1 | Enhanced Options | Indicates which optional enhanced features are implemented in the transceiver |
| 94 | 1 | SFF-8472 Compliance | Indicates which revision of SFF-8472 the transceiver complies with |

TABLE 1-continued

| Data Address | Size (Bytes) | Name of Field | Description of Field |
|---|---|---|---|
| 95 | 1 | CC_EXT | Check code for the Extended ID Fields |
| 96-127 | 32 | Vendor Specific | Vendor specific EEPROM |
| 128-255 | 128 | Reserved | Reserved for future use |

Additional definitions of these terms and identifiers, as well as others, are contained in the above described publications as well as other publications describing monitoring interfaces known to one of ordinary skill in the art.

Figure 8:
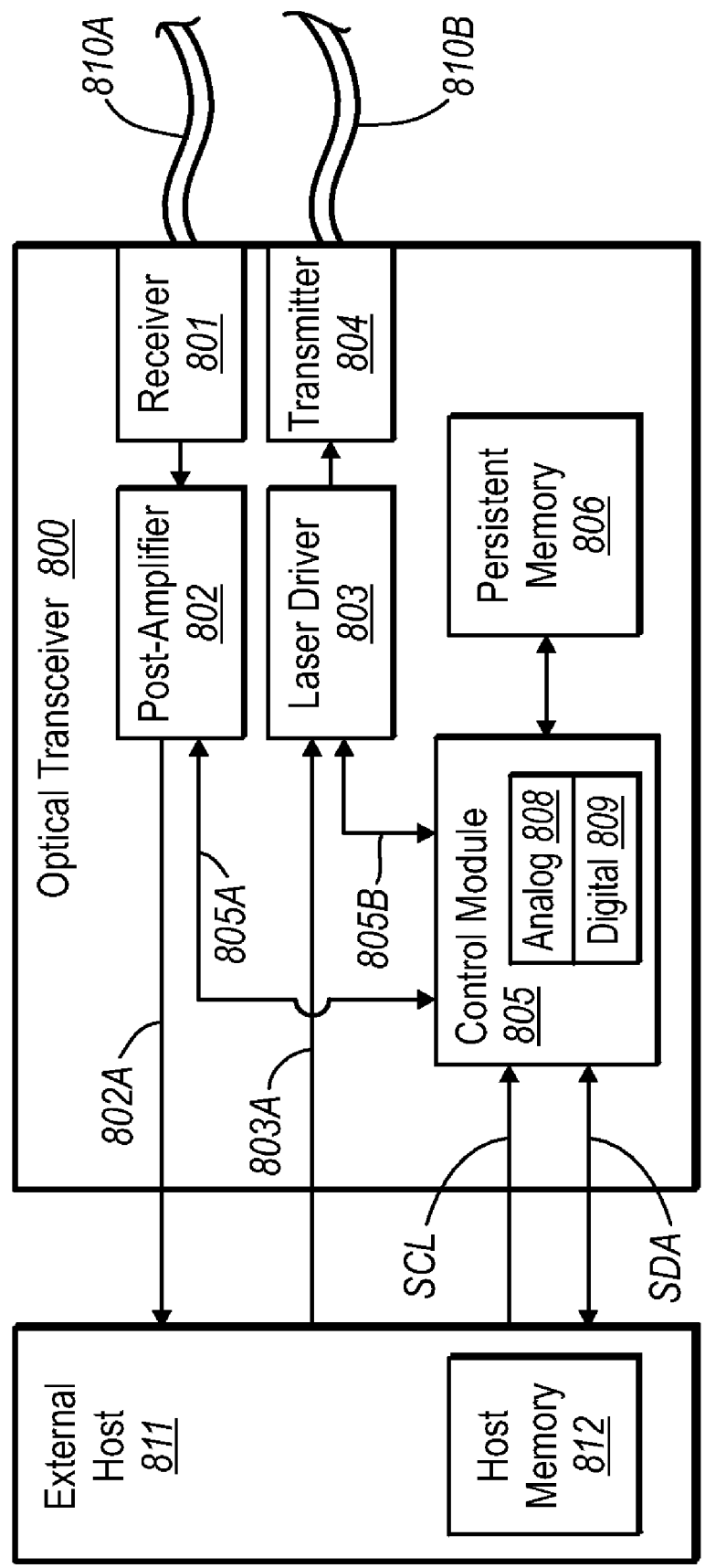
FIG. 8 illustrates an exemplary optical transceiver capable of creating digital diagnostic data according to the present invention.

FIG. 8 illustrates an optical transceiver 800 capable of generating digital diagnostic data according to embodiments of the present invention. While the exemplary optical transceiver 800 will be described in some detail, the optical transceiver 100 is described by way of illustration only, and not by way of restricting the scope of the invention.

The optical transceiver 800 receives a signal from fiber 810A using receiver 801. The receiver 801 acts as an opto-electric transducer by transforming the optical signal into an electrical signal. The receiver 801 provides the resulting electrical signal to a post-amplifier 802. The post-amplifier 802 amplifies the signal and provides the amplified signal to an external host 811 as represented by arrow 802A. The external host may be any computing system capable of communicating with the optical transceiver 800.

The optical transceiver 800 may also receive electrical signals from the host 811 for transmission onto the fiber 810B. Specifically, the laser driver 803 receives the electrical signal as represented by the arrow 803A, and drives the transmitted 804 to emit onto the fiber 810B optical signals representative of the information in the electrical signal provided by the host 811. Accordingly, the transmitter 804 serves as an electro-optic transducer.

The behavior of the receiver 801, the post-amplifier 802, the laser driver 803, and the transmitter 804 may vary dynamically due to a number of factors. For example, temperature changes, power fluctuations, and feedback conditions may affect the performance of the components. Accordingly, the monitoring interface within the optical transceiver may evaluate several parameters such as temperature, internally measured supply voltage, TX bias current, TX output power, received optical power, and additional quantities that can be also defined in the future. These values may be of interest to a user and may be displayed to a user along with an eye-diagram and/or network protocol analysis results and other information according to example embodiments of the present invention. For example, a user may want to know the optical power of the signal received, and this type of information, as well as other types of information, may be received from the monitoring interface of an optical transceiver and displayed for the user along with an eye-diagram and/or network protocol analysis results. Accordingly, the laser transmitter/receiver 800 includes a control module 805, which may evaluate temperature and voltage conditions and other operational circumstances, which receives information from the post-amplifier 802 (as represented by arrow 805A) and from the laser driver 803 (as represented by arrow 805B). This allows the control module 805 to counteract the dynamically varying performance, and detect when there is a loss of signal. Specifically, the control module 805 may counteract changes by adjusting settings on the post-amplifier 802 and/or a laser driver 803 as represented by the arrows 805A and 805B.

The control module 805 may have access to persistent memory 806. Data and clock signals may be provided from the host 811 to the control module 805 using the serial clock line SLC, and a serial data line SDA. Also data may be provided from the control module 805 to the host 811 using serial data signal SDA to allow for the display of digital diagnostics and readings of temperature levels, transmit/receiver power levels, and the like. The control module 805 may further include both an analog portion 808 and a digital portion 809. Together, they allow the control module 805 to implement logic digitally, while still largely interfacing with the rest of the optical transceiver 800 using analog signals.

Another example of a device with a monitoring interface providing digital diagnostic data is the Dallas Semiconductor DS1849 transceiver controller that provides access to temperature, data, and device control via a two wire interface. The DS1849 transceiver controller can manage system monitoring, biasing, logic functions, and calibration functions in a fiber-optic data transceiver module. Its functions can include 2-wire communications with the host system. The DS1849 can have programmable alarm and warning conditions for four analog-to-digital conversion values as well as temperature. These conditions can be used to determine critical parameters inside each module and output these parameters to a user along with an eye-diagram and/or network protocol analysis results or other information as described herein.

According to an embodiment of the present invention, data received from a monitoring interface of an optical transceiver can be displayed along with an eye-diagram constructed using conventional methods, for example using an oscilloscope or similar components, or using any combination of the aspects of the present invention discussed herein, for example using undersampling of a signal. For example, a processor and display, or other apparatus, can be implemented to display the diagnostic data along with the eye-diagram and/or along with network protocol analysis results.

Figure 9:
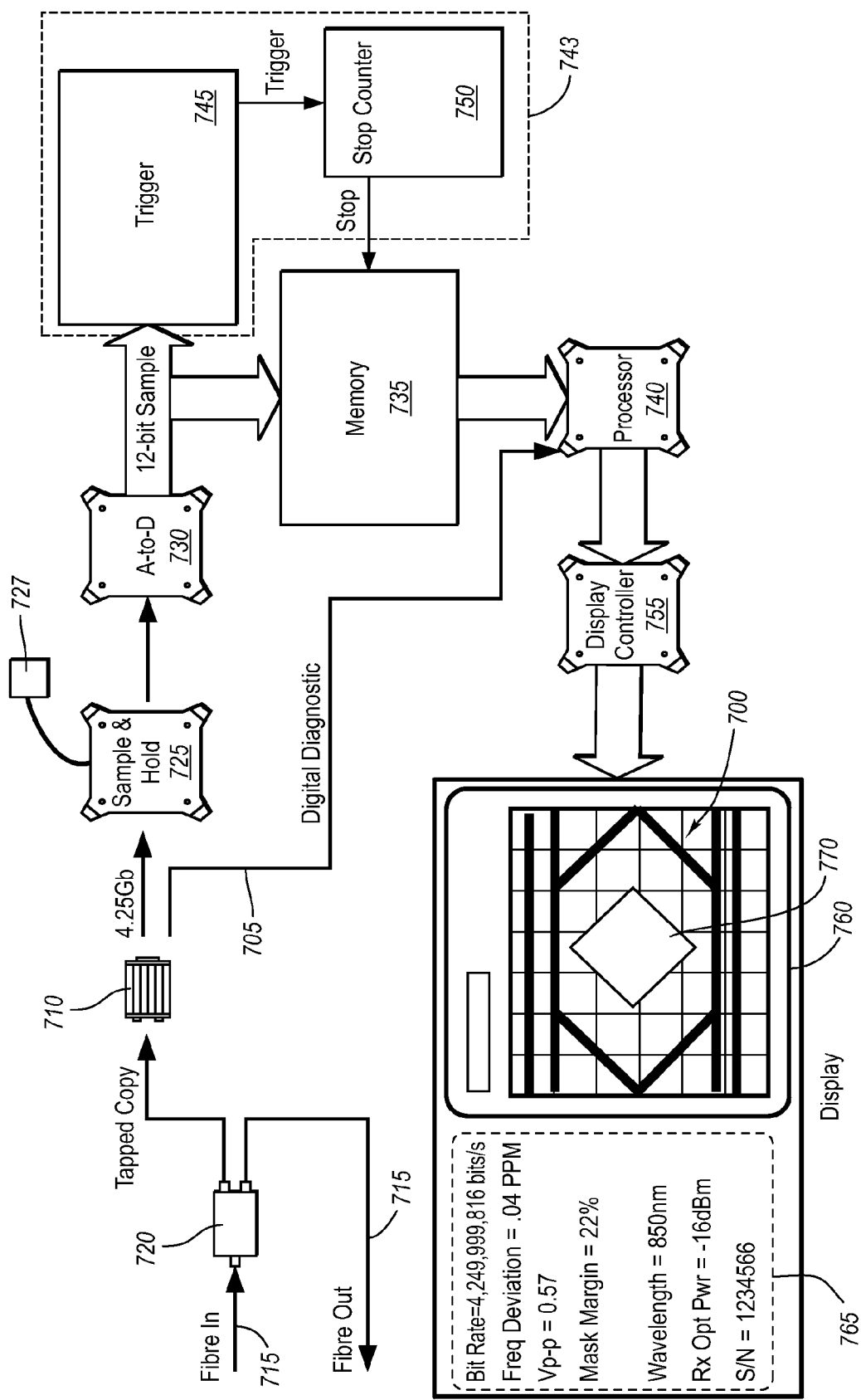
FIG. 9 illustrates an apparatus for displaying an eye-diagram along with data received from a monitoring interface of an optical transceiver according to an example embodiment of the present invention.

Example embodiments of the present invention can include combining methods and apparatuses for displaying transceiver diagnostic data along with other aspects of the present invention discussed herein. For example, referring to FIG. 9, an apparatus for displaying an eye-diagram 700 along with data 765 received from a monitoring interface of an optical transceiver 710 is shown according to an example embodiment of the present invention. A signal transmitted in a transmission link 715 can be received by a tapping device 720. A copy of the signal can be transmitted to the transceiver 710 while the signal is allowed to continue along the transmission link 715 to its destination, or can be reproduced and transmitted along the communication link 715 depending on the type of tap used.

The tapped copy of the signal can be received by the transceiver 710 (e.g., a SFP or GBIC transceiver module) having a monitoring interface. The signal can be transmitted from the transceiver 710 to a sample and hold device 725, such as a sample and hold circuit, that can sample the signal at a predetermined rate and hold the value of each sample for an analog to digital converter 730 to measure and store the sample in a memory 735. The sample and hold device 725 can under-sample the signal received from the transceiver 710 at a percentage of a harmonic frequency of the bit-rate of the signal. The sample rate can be controlled by a clock 727. The clock 727 can be any timing device. The sample rate of the sample and hold device 725 can be designated for a particular bit-rate of an optical channel, or the sample and hold device 725 can sample the signal at several different frequencies for several different bit-rates of different optical channels. The frequency of the sampling of the sample and hold device 725 can be determined by the clock 727, that can be part of the sample and hold device 725, or the clock 727 can be located externally to the sample and hold device 725 as shown. The frequency of the sampling of the sample and hold device 725 can also be determined at least in part based on the maximum rate of any component of the system, such as for example the maximum sample rate of the sample and hold device 725 or the maximum operating rate of the analog to digital converter 730.

The memory 735 can receive the samples (e.g., 12 bit samples) from the analog to digital converter 730 and store the samples in memory 735 for access by a processor 740. A trigger point can be identified. For example, the samples of data can be queried to determine a maximum value and a minimum value sampled. A location of a trigger can be calculated by dividing the difference between the minimum sample value and the maximum sample value by two and adding this value to the value of the minimum sample value.

Different methods and apparatuses can be used to construct the eye-diagram of the signal using the trigger. An optional triggering apparatus 743 can be coupled to the analog to digital converter 730 and can receive the data from the analog to digital converter 730 and lock on a trigger point within the signal received to help construct the eye-diagram as it received by the memory 735. A trigger 745 can transmit the trigger signal to a stop counter 750 that stops after a sufficient amount of samples have been saved in the memory 735. The processor 740 can then process the data stored in the memory 735, generate the eye-diagram 700, and output the eye-diagram 700 to a display controller 755 that displays the eye-diagram 700 on a display 760 (e.g., an LCD display of a stand alone unit or a display of a network analyzer).

According to embodiments of the present invention, the signal 705 from the monitoring interface of the transceiver 710 can also be received by the processor 740. The processor 740 can interpret the signals 705 received (e.g., including fields and identifiers such as those illustrated above in Table 1) and transmit data to the display controller 755 such that information received from the monitoring interface is displayed on at least a portion 765 of the display 760 along with, or separate from, the eye-diagram 700.

Other embodiments of the present invention can be similar to that described above except that the optional trigger 745 and stop counter 750 can be excluded, or not used. The processor 740 can calculate a trigger and construct the eye-diagram 700 from a number of samples stored in the memory 735. For example, the sample and hold device 725 can sample the signal that is transmitted at a known bit-rate. The sample and hold device 725 can sample the signal at a unit step to ensure that a trigger point will be sampled based on the amount of time that it takes for the signal to transition across the midpoint. For example, a sample unit step of about 0.2% of the bit-rate unit may be sufficient in some instances to ensure that the trigger point is sampled. In some instances, higher and lower unit steps can be used to ensure that the midpoint is sampled. This may depend on the amount of time it takes for the signal to transition between a high value and a low value or vice versa. This duration can be used to calculate the number of samples per bit unit needed to ensure that the trigger point is sampled according to example embodiments of the present invention.

Undersampling can also be used to ensure that the trigger point is sampled while still allowing for cost-effective equipment, such as a lower speed display 760, a lower speed sample and hold device 725 and/or a lower speed analog to digital converter 730 to be used. For example, the frequency of the sampling of the signal can be conducted slightly faster or slightly slower than a harmonic frequency (e.g., 111 in FIG. 1A) of the signal bit-rate at a unit step (e.g., 110 in FIG. 1A) so as to ensure that the trigger point is sampled. The harmonic frequency of the sampling can be the harmonic frequency of the signal divided by an integer and multiplied by a percentage other than 100%.

Samples of the signal can be stored in the memory 735 and the processor 740 can access the samples and locate a trigger point. Because the sample rate of the sample and hold device 725 is known along with the bit-rate of the signal, the eye-diagram 700 can be generated by the processor 740 by reconstructing the data into a signal that provides information (e.g., jitter) about the signal similar to that which would have been provided using conventional methods of constructing an eye-diagram.

The eye-diagram data can be transmitted to a display controller 755 along with the digital diagnostic data 705 received from the monitoring interface. The display controller can output the data received from the processor 740 to the display 760 in the form of an eye-diagram 700 and/or the data 765 received from the monitoring interface of the transceiver 710. An eye mask 770 or other tools for analyzing the eye-diagram 700 can also be displayed as well as other useful information for analyzing the signal.

Embodiments of the present invention can be a stand-alone unit and also can be combined with a conventional or special purpose network analysis device. When combined with a network protocol analysis device, additional information can be displayed related to network protocol analysis conducted and results of the network protocol analysis. This network protocol analysis information can be displayed along with an eye-diagram and/or diagnostic data received from a diagnostic bus as discussed herein.

Figure 10:
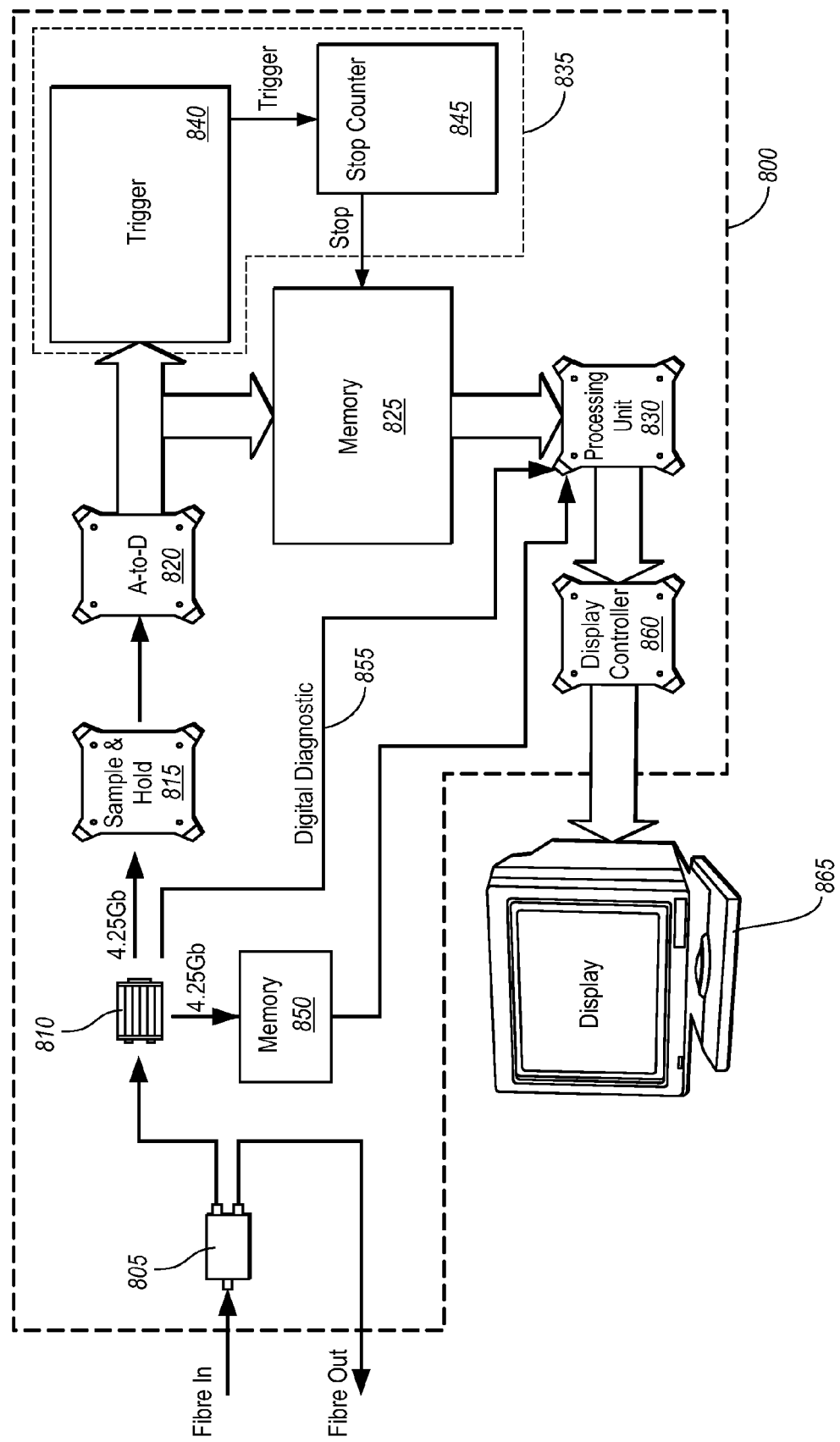
FIG. 10 illustrates an apparatus for displaying network protocol analysis results and information along with an eye-diagram and information received from a monitoring interface of a transceiver according to an example embodiment of the present invention.

For example, referring to FIG. 10, an apparatus 800 for displaying network protocol analysis results and information along with an eye-diagram and information received from a monitoring interface of a transceiver is illustrated according to an example embodiment of the present invention. A signal transmitted in a transmission link can be received by a tap 805 or other device for receiving and/or producing a copy of the signal. It should be appreciated that the tap 805 can be eliminated where it is not necessary to make a copy of the signal and allow the signal to continue on to its destination. In this embodiment, a tapped copy of the signal can be received by a transceiver 810. The transceiver 810 can produce two copies of the signal. A first copy of the signal can be received by a sample and hold device 815 that samples the analog signal and can provide the analog samples to an analog to digital converter 820. The analog to digital converter 820 can convert the analog samples received from the sample and hold device 815 into digital samples. The analog to digital converter 820 can store the digital samples in a memory 825 for access by a processing unit 830. The analog to digital converter 820 can also forward the samples to an optional trigger apparatus 835 including a trigger 840 and a stop counter 845 for identifying trigger values within the samples as they are received and storing the data within the memory 825 along with data indicating a trigger point of the signal.

The processor 830 can access the samples in the memory 825 and construct an eye-diagram. A second copy of the signal can also be stored within a second memory 850 accessible by the processing unit 830 for network protocol analysis. It should be appreciated that the data stored for network protocol analysis can be stored in the same memory 825 as the data for construction of the eye-diagram. Any of the data can be stored in multiple memory buffers. The processing unit 830 can conduct network protocol analysis of the data stored in the memory 850 (or the data stored in memory 825). The network protocol analysis can be any type of network protocol analysis known to one of ordinary skill in the art. For example, the network protocol analysis can include network analysis using commercially available software and hardware.

For example, network protocol analysis can include debugging, reporting, and performance analysis tests and software. This can further include, for example, checking for bit errors, dropped frames, in-order delivery, troubleshooting network problems, identifying performance issues, upper layer protocol issues, logical, physical, and application layer issues, performance metrics and problems, symptoms of network problems, data errors, debugging applications, monitoring network traffic for performance, bandwidth usage, security analysis, analyzing network traffic to trace specific transactions or find security breaches, monitoring employee use and access, email communication, checking packet integrity, validating checksum and other fields of packets, monitoring transactions for policy purposes, decoding network and application protocols as are known in the art. Network protocol analysis can also include providing the user with graphical views, results of analysis, providing recommendations, or suggesting corrective actions.

Digital diagnostic data 855 can be received by the processing unit 830 from a monitoring interface of the transceiver 810. The digital diagnostic data 855 can describe several parameters of the optical signal, the optical communication link, and/or the hardware such as the transceiver 810. The processor 830 can conduct additional analysis and/or interpretation of the data 855 received from the monitoring interface prior to displaying the data 855 on the display 865. The processing unit can transmit eye-diagram data along with network protocol analysis data, and digital diagnostic data to a display controller 860 for controlling display of this information to a user using the display 865 (e.g., a LCD screen or a monitor).

An apparatus according to the present invention can include hardware for performing any aspect of the present invention in any combination or configuration. For example, apparatuses can display only an eye-diagram that is generated using methods of the present invention. Other embodiments of the present invention can display an eye-diagram generated using any method along with data received from a monitoring interface of a transceiver and/or network protocol analysis results or information. Moreover, data received from a monitoring interface of a transceiver can be displayed independent of, or in combination with an eye-diagram and/or network protocol analysis results or information.

Figure 11:
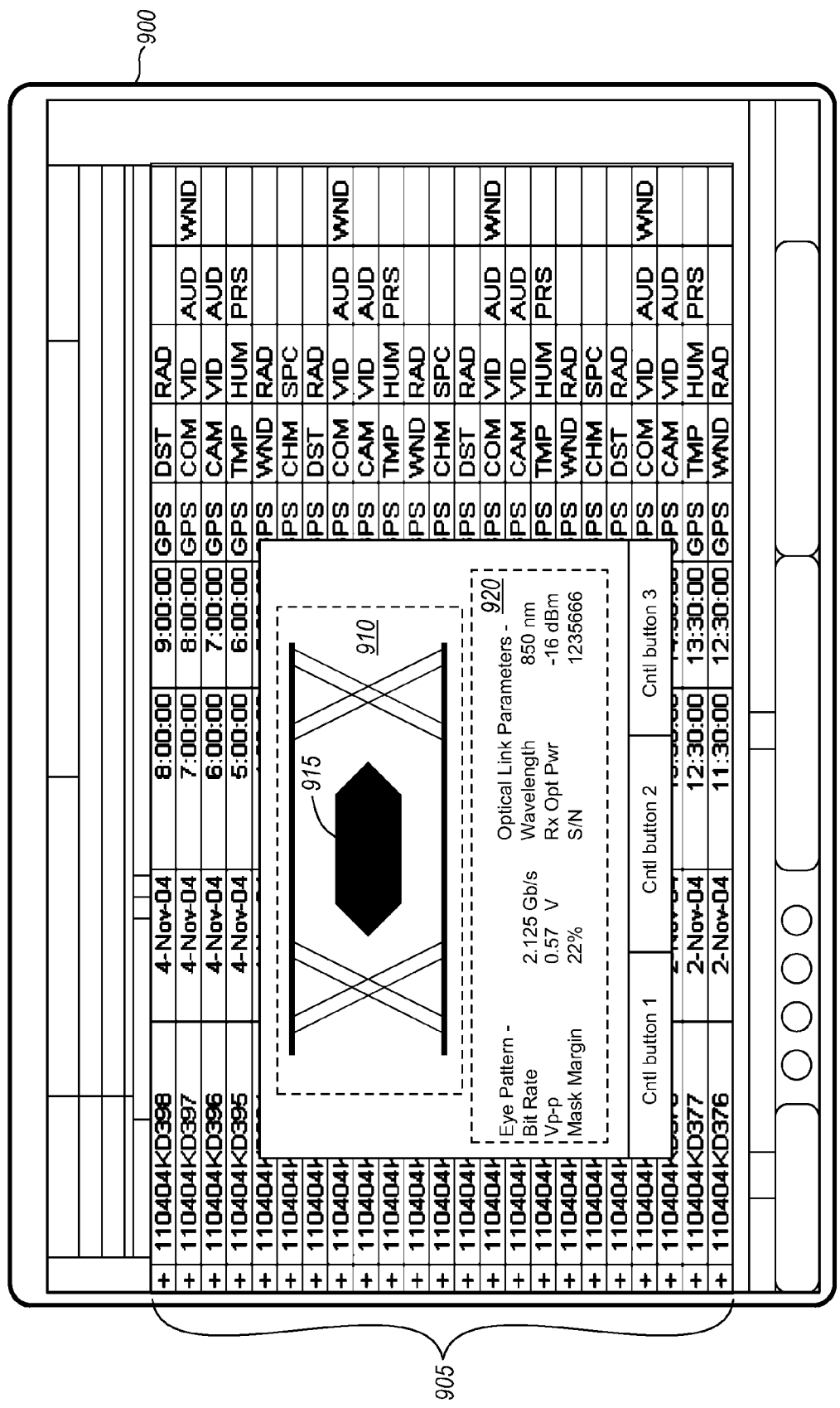
FIG. 11 illustrates an example of a display screen according to an example embodiment of the present invention.

Referring to FIG. 11, an example of a display screen 900 is illustrated according to an example embodiment of the present invention. As shown, the display screen 900 can display various types of information for use in analyzing a transmission link and signal. The display 900 can display network protocol analysis results 905. The display 900 can also display an eye-diagram 910 for a signal. The eye-diagram 910 can include additional features and information such as an eye mask 915 for identifying portions of the eye-diagram 910 that may result in a misinterpretation of the data signal. The display 900 can also display additional information 920 including digital diagnostic information received from a monitoring interface of a transceiver.

The different types of information can be displayed as a selectable option to a user, or can be default settings by a manufacturer. For example, display of the eye-diagram 910, eye mask 915, digital diagnostic data 920, network protocol analysis results 905, etc. can each be optional, and display of the different types of data, as well as parameters for conducting analysis or generation of the eye-diagram, can be selectable by a user.

Figure 12:
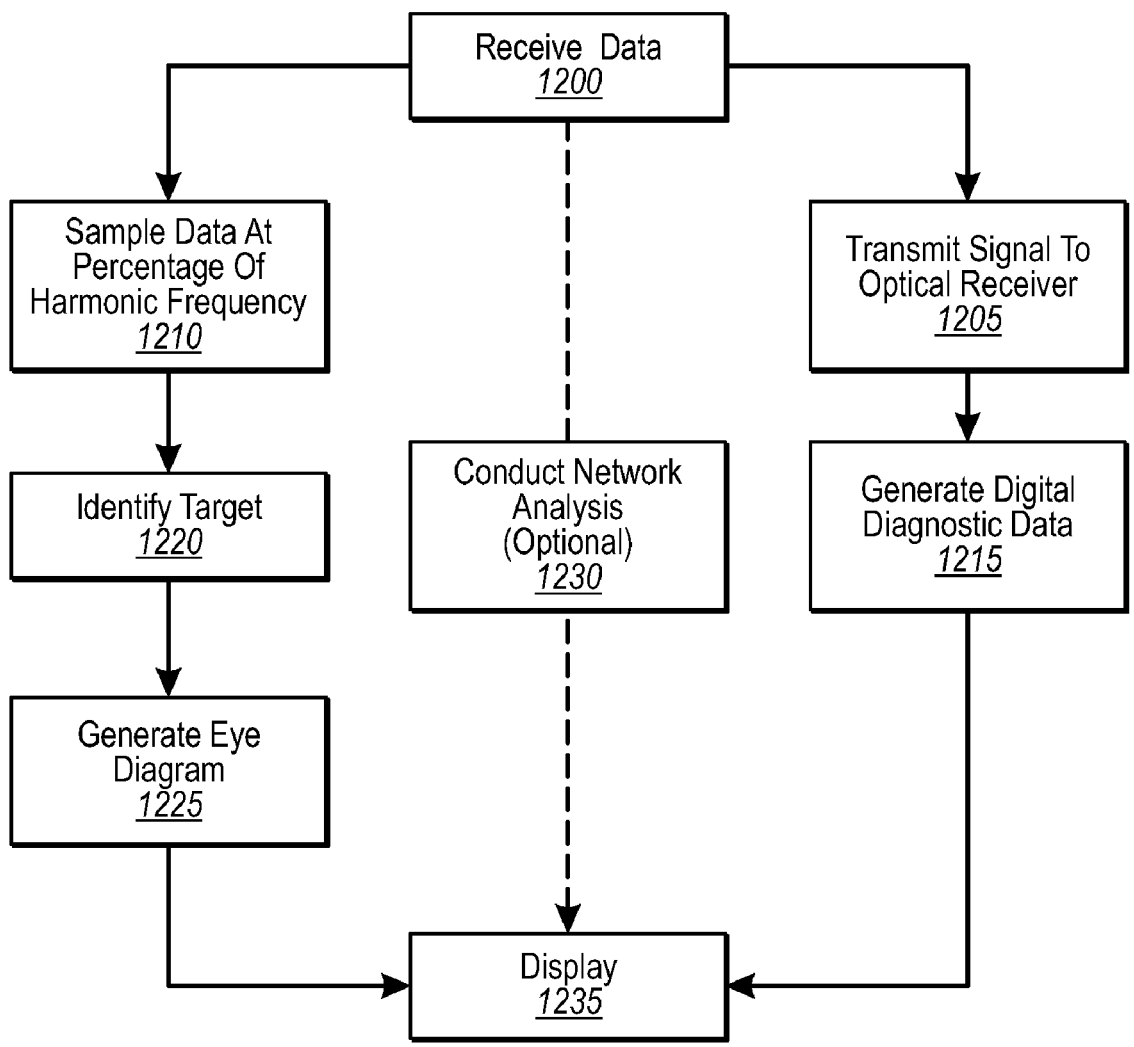
FIG. 12 illustrates a method for displaying various types of information and data relevant to analyzing a data transmission link according to an example embodiment of the present invention.

Referring to FIG. 12, a method for displaying various types of information and data relevant to analyzing a data transmission link and signal is shown according to an example embodiment of the present invention. A signal transmitted in a transmission link can be received (1200). The signal can be received by a tap, or other physical connection to the transmission link. At least one copy of the signal can be produced and a copy can be forwarded to a processor for network protocol analysis 1230 of the signal. The signal intended for network protocol analysis can be stored in a memory buffer for access by the processor conducting the network protocol analysis.

The copy of the signal, or another copy of the signal, can be received 1210 by a sample and hold or other sampling device. The sample and hold device can hold the value of the signal for an analog to digital converter to measure and convert from an analog sample value to a digital sample value. The analog to digital converter can store the digital samples in a memory for access by a processor. The memory can be the same memory that stores the data for network protocol analysis, or the memory can be a different memory than that which stores the data for network protocol analysis. An optional trigger apparatus can be used to identify 1220 a target sample value and target sampling of the data on the target point. According to another embodiment, a large amount of samples can be taken for generating the eye-diagram. For example the signal can be sampled at a fraction or multiple (i.e., under-sampling) of a harmonic frequency of the bit-rate of the signal transmission rate.

An eye-diagram can be generated 1225 from the data. The eye-diagram can be generated 1225 by locating the trigger point and sampling the signal to construct the eye-diagram in the instance that the optional trigger and stop counter were used by over lacing oscillations of unit bits of the signal. A processor can also analyze the data to determine a trigger point. The trigger point can be identified by locating a maximum and minimum value of the eye-diagram and calculating a mid point in between the maximum and minimum points. An eye-diagram can be generated from this data using the trigger as a reference point.

Network protocol analysis may also be conducted on the data (1230). Network protocol analysis can be conducted by the same processor as the processor used for generation of the eye-diagram, or a different processor (or multiple processors) can be used for network protocol analysis than that which constructs the eye-diagram.

After receiving the data signal 1200, the signal may be transmitted 1205 to an optical receiver. Using a monitoring interface, the optical receiver may generate 1215 digital diagnostic data. The digital diagnostics can be any type of data received from a monitoring interface of an optical transceiver (e.g., a SFP or GBIC transceiver), such as a transceiver digital diagnostics bus for example. Finally, the results of the eye-diagram and digital diagnosis are displayed 1235, and may include the network protocol analysis.

Embodiments of the present invention may include or be conducted using a special purpose or general-purpose computer, processor, or logic device including various computer hardware and devices, as discussed in greater detail herein or known to one of ordinary skill. Embodiments within the scope of the present invention can also include computer-readable media for carrying or having computer-executable instructions or data structures stored thereon. Such computer-readable media can be any available media that can be accessed by a general purpose computer, special purpose computer, or a logic device. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose computer, special purpose computer, or other logic device. When information is transferred or provided over a network or other communication connection (either hardwired, wireless, or a combination of hardwired or wireless) to a computer, the computer can properly view the connection as a computer-readable medium. Thus, any such connection is properly termed a computer-readable medium. Various combinations of the above should also be included within the scope of computer-readable media. Computer-executable instructions comprise, for example, instructions, logic, and data which cause a general purpose computer, special purpose computer, or logic device to perform a certain function or group of functions.

Each of the processors described herein can be a single conventional general purpose computer, special purpose computer, or logic device, or each processor can be multiple processors including multiple conventional general purpose computer, special purpose computers, or multiple logic devices. Moreover, many of the functions that take place using a processor can be implemented on other types of logic devices, such as programmable logic devices. In addition, additional processors, logic devices, or hardware may be implemented to carry out a given function or step according to additional embodiments of the present invention. For example, additional processors may be implemented for storage and retrieval of data as is known to one of ordinary skill in the art. Such details have been eliminated so as to not obscure the invention by detail.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a communications system, a method for displaying information describing a signal transmitted in the communication system, the method comprising the following:

receiving the signals with a tapping device;
   transmitting the signal to a transceiver, the transceiver including a monitoring interface for performing digital diagnostic analysis of the signal, including real time access to access describing signal parameters;
   sampling the signal at a percentage of the harmonic frequency of the signal, the harmonic frequency of the signal being equal to the bit-rate divided by an integer;
   identifying a target as a midpoint between a maximum signal sample and the minimum signal sample;
   constructing an eye-diagram using the target as a reference point by identifying a point where multiple waveform crossings are displayed simultaneously in an overlaid time base; and
   displaying the digital diagnostic data received from the monitoring interface of the transceiver together with the eye-diagram for the signal.

2. A method according to claim 1, wherein the digital diagnostic data displayed comprises at least one of the following:

a type of transceiver;
   connector type;
   electronic compatibility or optical compatibility;
   serial encoding algorithm;
   nominal bit rate;
   link length supported for optical fiber;
   link length supported for copper fiber;
   SFP vendor name (ASCII);
   SFP vendor IEE company ID;
   part number;
   laser wavelength;
   upper bit rate margin;
   lower bit rate margin;
   serial number provided by vendor (ASCII);
   vendor's manufacturing data code;
   data indicating which type of diagnostic monitoring is implemented (if any) in the transceiver;
   data indicating which optional enhanced features are implemented (if any) in the transceiver;
   data indicating which revision of SFF-8472 the transceiver complies with;
   and check code for extende3d ID fields; or
   vender specific EEPROM.

3. A method according to claim 1, wherein the digital diagnostic data displayed comprises $I^2C$ data.

4. A method according to claim 1, wherein the transceiver is one of an SFP or a GBIC transceiver or an XFP transceiver.

5. A method according to claim 1, wherein the digital diagnostic data and the eye-diagram are displayed together with network protocol analysis on a display of a network analyzer.

6. A method according to claim 5, wherein the display of the digital diagnostic data, the network protocol analysis result, and the eye-diagram is selectable by a user on the display of a network analyzer.

7. A method according to claim 1, wherein the percentage is between about 90 percent and 99.99 percent or between about 100.01 percent and 110 percent.

8. A method according to claim 1, wherein a clock provides a clock signal at the percentage of the harmonic frequency to a sample and hold circuit to sample the signal at the percentage of the harmonic frequency.

9. A method according to claim 7, wherein the bit-rate is between 1 gigabytes per second and 10 gigabytes per second.

10. An apparatus for displaying digital diagnostic data along with an eye-diagram, the apparatus comprising:

a transceiver configured to receive the signal, the transceiver including a monitoring interface providing digital diagnostic data including real time access to information describing signal parameters;
    a processor including computer executable instructions that cause the processor to generate an eye-diagram when the computer executable instructions are executed; and a display configured to receive and display the digital diagnostic data along with the eye-diagram;

wherein the processor selectably displays the digital diagnostic data, the eye-diagram, together with network protocol analysis result on the display.

11. An apparatus according to claim 10, wherein the digital diagnostic data displayed comprises I²C data.

12. An apparatus according to claim 10, wherein the transceiver is a SFP transceiver or a GBIC transceiver.

13. An apparatus for displaying digital diagnostic data along with an eye-diagram, the apparatus comprising:

a transceiver configured to receive the signal, the transceiver including a monitoring interface providing digital diagnostic data including real time access to information describing signal parameters;

a processor including computer executable instructions that cause the processor to generate an eye-diagram when the computer executable instructions are executed;

a display configured to receive and display the digital diagnostic data along with the eye-diagram;

wherein the digital diagnostic data displayed comprises at least one of:

a type of transceiver;
connector type;
electronic compatibility or optical compatibility;
serial encoding algorithm;
nominal bit rate;
link length supported for optical fiber;
link length supported for copper fiber;
SFP vendor name (ASCII);
SFP vendor IEE company ID;
part number;
laser wavelength;
upper bit rate margin;
lower bit rate margin;
serial number provided by vendor (ASCII);
vendor's manufacturing data code;
data indicating which type of diagnostic monitoring is implemented (if any) in the transceiver;
data indicating which optional enhanced features are implemented (if any) in the transceiver;
data indicating which revision of SFF-8472 the transceiver complies with;
and check code for extende3d ID fields; or
vender specific EEPROM.

14. An apparatus for displaying digital diagnostic data along with an eye-diagram, the apparatus comprising:

a transceiver configured to receive the signal, the transceiver including a monitoring interface providing digital diagnostic data including real time access to information describing signal parameters;

a processor including computer executable instructions that cause the processor to generate an eye-diagram when the computer executable instructions are executed;

a display configured to receive and display the digital diagnostic data along with the eye-diagram;

a clock configured to provide a clock signal at a harmonic sample frequency of a bit-rate of the signal, wherein the harmonic sample frequency is a percentage other than 100% of the frequency of a bit-rate of the signal;

a sampling device for sampling the signal, wherein the sampling device samples the signal at the harmonic sample frequency of the clock;

an analog to digital converter for receiving the samples and converting the samples from analog samples to digital samples;

a memory for receiving and storing the digital samples; and a display controller for receiving the digital diagnostic data and at the eye-diagram and displaying the digital diagnostic data and the eye-diagram.

15. An apparatus according to claim 14, wherein the processor selectably displays the digital diagnostic data, the eye-diagram, together with network protocol analysis result on the display.

16. An apparatus according to claim 14, wherein the apparatus is either a standalone device for generating and displaying the eye-diagram or a network analyzer for generating and displaying the eye-diagram and digital diagnostic information together with a result of network protocol analysis conducted by the network analyzer.

17. An apparatus according to claim 14, wherein the processor further comprises computer executable instructions that cause the processor to display an eye mask along with the eye-diagram on the display.

18. An apparatus according to claim 14, wherein the percentage is between about 90 percent and 99.99 percent or between about 100.01 percent and 110 percent.

19. An apparatus according to claim 14 wherein the harmonic frequency is calculated by dividing the bit-rate by an integer to obtain a harmonic frequency that is within a maximum capability of either the sampling device or the analog to digital converter.

20. An according to claim 19, wherein the integer is between 1 and 100.

* * * * *